(12) United States Patent
Desai et al.

(10) Patent No.: US 12,452,778 B2
(45) Date of Patent: *Oct. 21, 2025

(54) AUTOMATED NEIGHBOR DISCOVERY TECHNIQUES FOR HYBRID ENVIRONMENTS

(71) Applicant: Cisco Technology, Inc., San Jose, CA (US)

(72) Inventors: Vishal S. Desai, San Jose, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,221

(22) Filed: Mar. 28, 2024

(65) Prior Publication Data

US 2024/0323821 A1 Sep. 26, 2024

Related U.S. Application Data

(63) Continuation of application No. 17/447,171, filed on Sep. 8, 2021, now Pat. No. 12,015,975.

(51) Int. Cl.
*H04W 4/00* (2018.01)
*H04W 8/00* (2009.01)
(Continued)

(52) U.S. Cl.
CPC ........... *H04W 48/16* (2013.01); *H04W 8/005* (2013.01); *H04W 48/10* (2013.01); *H04W 72/52* (2023.01); *H04W 74/0816* (2013.01)

(58) Field of Classification Search
CPC ...... H04W 8/005; H04W 48/10; H04W 48/16
See application file for complete search history.

(56) References Cited

U.S. PATENT DOCUMENTS 8,630,255 B1 * 1/2014 Kunz ............... H04B 7/0825
455/562.1
11,184,949 B1 * 11/2021 Wang ............... H04W 48/20
(Continued)

FOREIGN PATENT DOCUMENTS

| EP | 3373617 A1 * | 9/2018 | ............ H04B 5/72 |
| KR | 20230087463 A * | 2/2021 | ............ H04W 88/02 |
| WO | WO-2021011476 A1 * | 1/2021 | ............ H04W 48/12 |

OTHER PUBLICATIONS

Hosni et al., Neighbor Discovery Schedule for 6LowPAN Smart Grid Applications, IEEE, pp. 1-6. (Year: 2016).*

*Primary Examiner* — Elisabeth Benoit Magloire
(74) *Attorney, Agent, or Firm* — Patterson + Sheridan, LLP

(57) ABSTRACT

Various embodiments herein disclose coordinating neighbor discovery between access points (APs) with auxiliary radios and APs without auxiliary radios. A corresponding wireless controller comprises a processor and a memory storing instructions that, when executed, cause the controller to perform operations. The operations comprise grouping APs into a first group of more flexible APs and a second group of less flexible APs and querying the second group of APs for a corresponding broadcast interval. The operations further comprise identifying when the second group of APs is scheduled to broadcast parameters, and a broadcast interval for each of the second group of APs and generating a schedule based on the scheduled broadcast and the broadcast interval for each of the second group of APs. The operations additionally comprise providing the generated schedule to the first group of APs and the second group of APs.

20 Claims, 6 Drawing Sheets

(51) Int. Cl.
*H04W 48/10* (2009.01)
*H04W 48/16* (2009.01)
*H04W 72/52* (2023.01)
*H04W 74/0816* (2024.01)

(56) References Cited

U.S. PATENT DOCUMENTS

| | | | | |
|---|---|---|---|---|
| 2008/0186917 | A1* | 8/2008 | Wu | H04W 36/10 |
| | | | | 370/331 |
| 2012/0083937 | A1* | 4/2012 | Kong | H04L 12/2829 |
| | | | | 700/295 |
| 2013/0029712 | A1* | 1/2013 | Shao | H04W 48/16 |
| | | | | 455/515 |
| 2016/0134539 | A1* | 5/2016 | Hui | H04L 43/08 |
| | | | | 709/223 |
| 2017/0135019 | A1* | 5/2017 | Vamaraju | H04W 36/302 |
| 2018/0007712 | A1* | 1/2018 | Lou | H04W 80/00 |
| 2019/0036583 | A1* | 1/2019 | Cherian | H04L 5/0035 |
| 2020/0267741 | A1* | 8/2020 | Kwon | H04W 72/121 |
| 2021/0377947 | A1* | 12/2021 | Changlani | H04L 5/001 |
| 2021/0409961 | A1* | 12/2021 | Changlani | H04W 48/16 |
| 2023/0319691 | A1* | 10/2023 | Homchaudhuri | H04W 24/02 |
| | | | | 370/328 |

* cited by examiner

AUTOMATED NEIGHBOR DISCOVERY TECHNIQUES FOR HYBRID ENVIRONMENTS

CROSS-REFERENCE TO RELATED APPLICATIONS

This application is a continuation of co-pending U.S. patent application Ser. No. 17/447,171 filed Sep. 8, 2021. The aforementioned related patent application is herein incorporated by reference in its entirety.

TECHNICAL FIELD

Embodiments presented in this disclosure generally relate to coordinating discovery of neighboring access points (APs) in a wireless communications system. More specifically, embodiments disclosed herein relate to generating schedules for APs to perform neighbor discovery (ND) based, at least in part, on capabilities of the APs.

BACKGROUND

Many electronic devices, implement some form of neighbor discovery (ND) mechanism using messaging. However, transmitting and receiving ND messages can impact efficiency for the corresponding devices, such as access points), because many such devices suspend communications on a home (or primary) channel to transmit the ND messages and to visit or hop to neighboring channels of other devices to obtain ND messages broadcast by these other devices. Such suspension of communications can cause traffic gaps on the home channel.

Such traffic gaps are reduced in certain devices that utilize an auxiliary radio dedicated to performing ND. For example, a first device with an auxiliary radio may employ a main radio that it uses to broadcast ND messages on a home or operating channel at regular intervals while the auxiliary radio is used to jump to other channels and there detect ND message for other devices or send the ND message for the first device. This may limit an impact of hops to the neighboring channels and improve communications efficiencies.

However, mixing of devices with auxiliary radios and devices without auxiliary radios may result in asymmetric communications and ND messages. For example, the devices with auxiliary radios emit their ND messages and receive ND message from other devices with the auxiliary radios while the devices without the auxiliary radio must still channel hop to perform neighbor discovery while broadcasting their ND message on the home channel when not channel hopping. This limits the communication efficiencies of the neighbor exchanges between the devices with and without auxiliary radios.

Thus, there is a need for mediating ND that improve communication efficiencies while enabling transmission and reception of ND messages between the devices having auxiliary radios and the devices without auxiliary radios.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figures 1, 2:
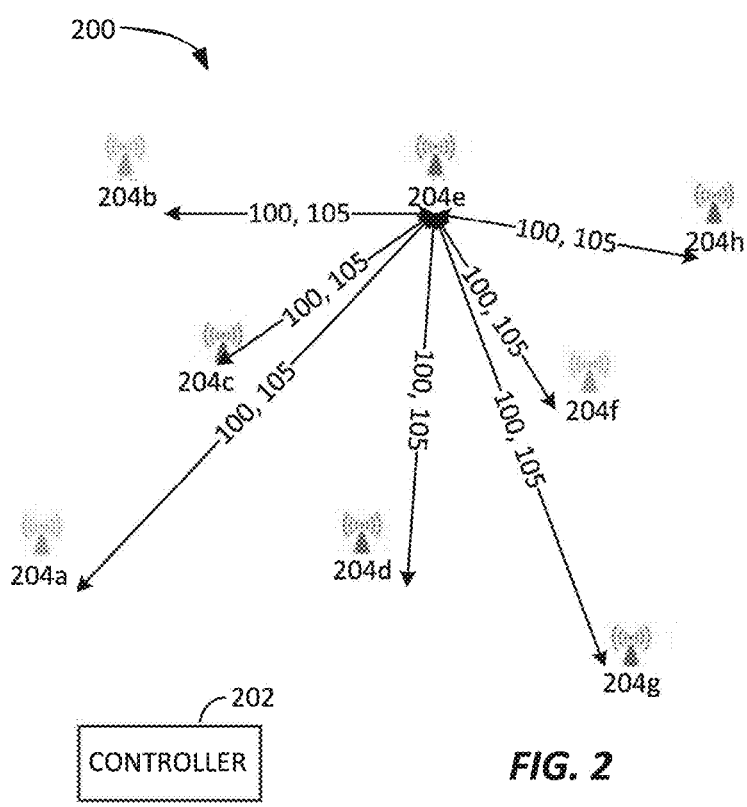
FIG. 1 depicts an example of neighbor discovery protocol (NDP) messages exchanged by devices in a wireless communication system, according to aspects described herein.
FIG. 2 depicts a block diagram for a wireless communication system, corresponding to the system described above with reference to FIG. 1, according to aspects described herein.

Various embodiments disclosed herein include apparatuses, systems, devices, and methods for scheduling discovery of neighbor access points (APs). A method comprises identifying a first set of APs having a main radio and an auxiliary radio and a second set of APs having only the main radio. The method further comprises identifying a broadcast message schedule for the second set of APs. The broadcast message schedule identifies when the second set of APs broadcasts neighbor discovery (ND) messages on corresponding home channels. The method additionally comprises generating a ND schedule for the first set of APs. The ND schedule indicates to the first set of APs when to monitor the corresponding home channels on which the second set of APs broadcasts the ND messages according to the broadcast message schedule. The method comprises providing the generated ND schedule to the first set of APs and the second set of APs. The method also comprises monitoring receipt of received ND messages from the first set of APs and the second set of APs according to the neighbor discovery schedule.

In accordance with some embodiments, a wireless controller comprises one or more processors and a memory storing instructions that, when executed by the one or more processors, cause the wireless controller to perform a method of discovering neighbor access points (APs). In accordance with some embodiments, a non-transitory computer readable storage medium has stored therein instructions, which, when executed by one or more processors of a wireless controller, cause the wireless controller to perform or cause performance of any of the methods described herein. In accordance with some embodiments, a wireless controller includes: a communication interface, one or more processors, and a non-transitory memory for performing or causing performance of any of the methods described herein.

Example Embodiments

In many communication systems, APs implement some form of AP discovery that enables an AP in the communication system to identify or discover neighboring APs in the communication system. For example, the APs may use a neighbor discovery protocol (NDP) or similar mechanism to discover the neighbor APs. The neighbor discovery (ND) mechanisms may reduce efficiency of communications by the APs because the mechanism may instruct the AP to leave its home channel periodically to determine what neighbor APs may be broadcasting on neighbor channels to the AP's home channel. For example, while an AP1 may communicate with devices on its home channel A, the AP1 may also periodically monitor (or hop to) neighbor channels B and C to determine whether neighbor APs exist on those neighbor channels B and C. Such hopping to channels away from its home channel A may disrupt communication efficiencies with the devices on the home channel A because the AP1 causes traffic gaps on the home channel A. Additionally, because the AP1 does not know when the neighbor APs broadcast ND messages, the AP1 may not hop to the neighbor channels B and C at most efficient times to discover neighbor APs on the neighbor channels B and C.

Furthermore, off-channel NDP messaging (i.e., messaging not on the home channel) may be constrained by aspects of the AP transmitting the NDP message. For example, there may be transmission delays, transmission power limitations, radio chain limitations, and so forth. In some embodiments, to improve upon such, and other, limitations, many APs now include auxiliary, smart radios dedicated to performing radio frequency management functions.

As communication system deployments often include a mix of APs with auxiliary radios and APs without auxiliary radios (and only main radios), ND mechanisms become asymmetric, meaning that different APs perform the ND different from other APs. For example, those APs having the auxiliary radios are able to perform ND using the auxiliary radios to emit or detect neighbor APs on neighbor channels while the main radio maintains communications on the home channel. On the other hand, those APs without the auxiliary radio are limited to hopping from their home channel to neighbor channels with the main radio to perform ND. Thus, the NDP messaging mechanism is asymmetric between the mix of different APs, thereby limiting efficiencies of such neighbor discovery and data exchanges.

The systems, methods, and apparatuses described herein provide a hybrid ND mechanism that enables both APs having main and auxiliary radios and APs having only main radios to coordinate NDP messaging, improving efficiencies of NDP message exchanges regardless of AP capabilities. Specifically, the systems, methods, and apparatuses described herein provide a scheduling mechanism that enables APs in a communication system to transmit updated NDP messages that include fields for exchanging information regarding the AP transmitting the updated NDP messages. Those APs that are determined to have auxiliary radios are grouped together and those without auxiliary radios are grouped together. A schedule for when APs without auxiliary radios transmit on-channel (i.e., home channel) NDP messages is determined and shared between APs having the auxiliary radios and without the auxiliary radios. Thus, each AP is made aware of when and where (what channel) neighbor APs are expected to transmit corresponding NDP messages. Accordingly, each AP can coordinate visiting the neighbor AP on the corresponding neighbor channel according to the received schedule to ensure that all APs in the communication system are able to discovery neighbor APs in the communication system. Further details of the generation and implementation of the schedule are provided below.

One embodiment presented in this disclosure that cures, or at least mitigates, the efficiency loses of ND in the example wireless communication system introduced above outlines a method of discovering neighbor devices, as introduced above, in a communication system.

While the example embodiments described herein relate to APs, similar methodologies can be applied to other wireless communication devices having different capabilities and configurations. In some embodiments, the APs and the controller described herein comprise a processor and memory and the like.

FIG. 1 depicts an example of NDP messages 100 and 105 exchanged by devices, such as APs, in a wireless communication system, according to aspects described herein. The NDP message 100 may correspond to a standard packet of data communicated to enable, for example, radio resource management (RRM) for devices that communication wirelessly. The NDP message 105 may correspond to an enhanced packet of data or fields communicated to enable RRM and the scheduling methods, systems, and apparatuses described herein.

In some embodiments, the devices (e.g., the APs) in the system periodically broadcast the NDP message 100. Each device in the system will listen to the NDP messages 100 from other devices in the system, thereby enabling each device to identify each other device communicating on the same or different channels. In some embodiments, the NDP messages 100 are broadcast at one or more predetermined power levels and one or more predetermined data rates.

The NDP message 100, as shown, includes a set of existing fields 102a-102n used to enable RRM in the system by providing the exchange of information between devices in the system. For example, the existing fields 102a-102n may include a radio identifier field, a group identifier field, a hash field, an internet protocol (IP) address, whether the NDP message 100 is encrypted, a version of the NDP message 100, an operating channel of a radio for the device sending the NDP message 100, encryption key information, a channel on which the NDP message 100 was broadcast, a transmit power at which the NDP message 10 was broadcast, an antenna pattern of the radio that broadcast the NDP message 100, and so forth.

In some embodiments, the NDP message 105 includes additional or new fields 104a-104m, that include information regarding a type of antenna used by the radio that broadcast the NDP message 105, details of the antenna pattern, contributing radio chains and respective power details, intended return time/interval until the device broadcasting the NDP message 105 will broadcast a subsequent NDP message 105 on that channel, and so forth. In some embodiments, where the NDP message 105 includes the existing fields 102a-102n, the devices of the system may only broadcast the NDP message 105. In some embodiments, the devices of the system may broadcast both the NDP message 100 and the NDP message 105, where the NDP message 105 may or may not include the existing fields of the NDP message 100 at the same or different times.

FIG. 2 depicts a block diagram for a wireless communication system 200, corresponding to the system described above with reference to FIG. 1, according to aspects described herein. The system 200 includes a plurality of devices, such as a controller 202 and APs 204a-204h. The APs 204a-204h communicate with each other and a controller 202, which may manage communications or settings of one or more of the APs 204.

The controller 202 may manage an initial calibration or configuration phase for the system 200, for example, at initialization, deployment, reset, or modification of the system 200. As part of this calibration phase, each AP 204 may perform off-channel scanning (scanning on channels other than the home channel for the AP 204) for a period. Additionally, each AP 204 may transmit, on each channel, one of each of the NDP message 100 and the NDP message 105. In some embodiments, the NDP message 100 is transmitted in a different cycle from the NDP message 105. A goal of the calibration phase is to setup a scan schedule for APs 204 that are connected to a wireless local area network controller (WLC) (not shown in the figures). Once the WLC has established a possible schedule for associated APs, the WLC coordinates with other WLCs to create a coordinate scheduled between the WLCs.

Based on the off-channel scanning, each AP 204 may identify the neighboring APs that exist in the system 200.

In some embodiments, based on the NDP messages 100 and 105 received when each AP 204 performed the off-channel scanning, each AP 204 may generate a report or the like to the controller 202. In some embodiments, the reports sent by each AP 204 to the controller 202 include the NDP messages 100 and 105 received by the AP 204 from the other APs 204 of the system 200. The controller 202 may use the information received in the NDP messages 100 and 105 and the information received from the APs 204 to group the APs into one or more groups. For example, the controller 202 may group the APs 204 based on capabilities, where those APs 204 that have auxiliary radios and main radios are grouped into a first group and those APs 204 that do not have auxiliary radios are grouped into a second group. In some embodiments, a group may be created based on APs 204 that are in a same radio frequency (RF) zone (for example, APs 204 that detect one another).

In some instances, the controller 202 designates a group leader (i.e., the WLC) for each group of APs 204, and the group leader evaluates the NDP messages 100 and 105 reported by each AP 204 to the controller 202 (or to the group leader, where each AP 204 reports the NDP messages 100 and 105 received to the group leader). For example, the controller 202 or the group leader may monitor the reported NDP messages to determine whether the AP 204 that transmitted the reported NDP message was transmitting on- or off-channel, whether the reported NDP message was the NDP message 100 or the NDP message 105, whether the AP 204 reporting the NDP message has an auxiliary radio or not, whether the AP 204 that transmitted the NDP message has an auxiliary radio or not, and the like. In some embodiments, the controller 202 or the group leader may group each AP 204 based on the reported information. The coordinated schedule may be created for these groups, as described above. An example embodiment of the grouped APs 204 is shown with respect to FIG. 3.

Figure 3:
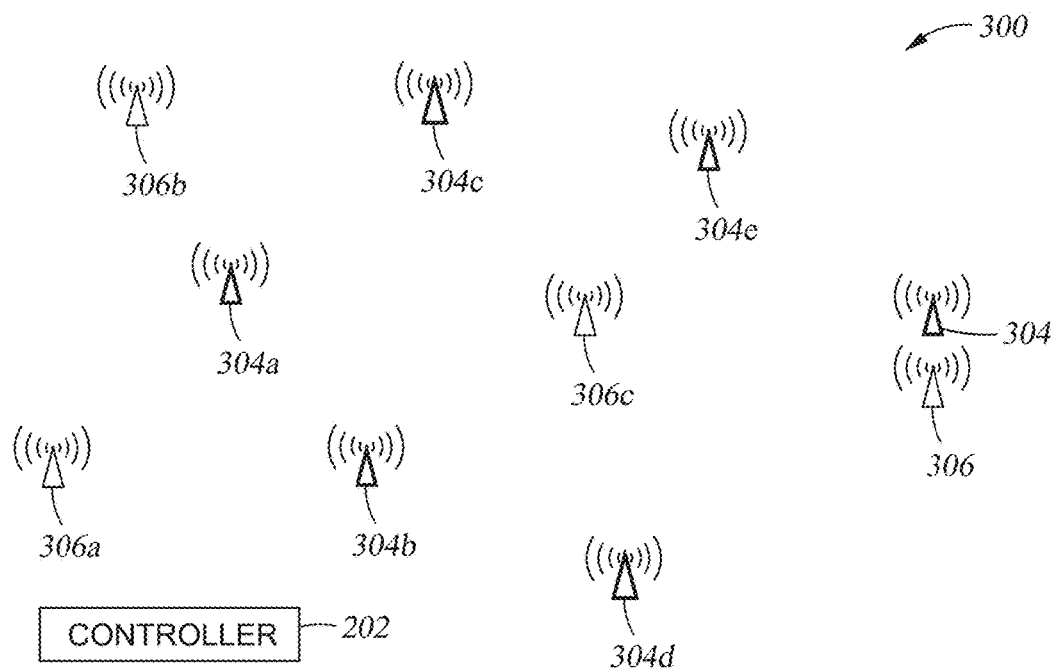
FIG. 3 depicts a block diagram for a wireless communication system, corresponding to the system described above with reference to FIG. 2, according to aspects described herein.

FIG. 3 depicts a block diagram for a wireless communication system 300, corresponding to the system 200 described above with reference to FIG. 2, according to aspects described herein. The system 300 includes a plurality of devices, such as a controller 302, corresponding to the controller 202, and two groups of APs corresponding to the APs 204. APs 304 correspond to the group of APs having the auxiliary and main radios and APs 306 correspond to the group of APs having only the main radio. As introduced above, the APs 304 and 306 may perform the calibration phase introduced above and be grouped into the groups of APs 304 and 306 by the controller 302 or one of the APs of the system 300.

Once the APs are grouped into the groups of APs 304 and APs 306, the controller 302 or the group leader APs, may determine on-channel NDP intervals or other NDP broadcast schedule information for the APs 306 that do not have the auxiliary radio. Because the APs 306 do not have the auxiliary radios, these APs must leave their home channels to scan for neighbor APs, meaning the AP 306 disrupts communications with components on its home channel every time the AP 306 scans for neighbor APs. Scanning for the neighbor APs may involve the APs 306 hopping to another channel and scanning or monitoring for NDP messages on the other channels, which may not even occur while the AP 306 is hopping to the other channel. Because of the limitations on the non-auxiliary radio APs 306 performing ND, the controller 302 may identify the broadcast schedule information for the non-auxiliary radio APs 306 before the APs 304 having the auxiliary radio. For example, the controller 302 can query a wireless local area network controller (WLC) for the APs 306, or the APs 306 directly, to identify the on-channel NDP intervals for the APs 306. In some embodiments, the controller 302 determines the on-channel NDP intervals for the APs 306 based on the NDP messages 100 and 105 reported by and on behalf of each AP 306. For the system 300, the controller 302 may determine that the APs 306 send corresponding NDP messages every 60 seconds on respective active channels. For example, the controller 302 may indicate that a first AP 306 transmits an NDP message every 60 seconds and that the first AP 306 sent its last NDP message 17 seconds ago. Therefore, a second AP 306 receiving this information from the controller 302 may determine or receive that the first AP 306 transmits its next NDP message on its active channel in 43 seconds. This allows the second AP 306 to know when it should jump to the active channel for the first AP 306 to detect the NDP message broadcast by the first AP 306 (such as in about 42, or 42.9 seconds) so that the second AP 306 is present on the active channel for the first AP 306 when the first AP 306 transmits the NDP message. Then, the second AP 306 can determine to come back to the first AP 306 active channel every 59.9 seconds or so to check that the AP 306 is still there (by receiving the corresponding NDP message).

In some embodiments, the controller 302 identifies the times at which each AP 306 broadcasts its respective NDP messages 100 and 105 on its home channel in the determined interval. For example, for the APs 306a, 306b, and 306c, the controller 302 may determine that the AP 306b transmits its NDP messages 100 and 105 at 12s after an initial time t0, that the AP 306a transmits its NDP messages 100 and 105 at 18s after the initial time t0, and that the AP 306c transmits its NDP messages 100 and 105 at 34s after the initial time t0, all within the NDP interval of 60s.

In some embodiments, more than one AP 306 has its NDP message transmission at a same time or multiple APs 306 broadcast their NDP messages 100 and 105 at times such that their broadcasts overlap. In such embodiments, the controller 302 may request that one or more of the overlapping APs 306 change their schedule for broadcasting the NDP messages 100 and 105. For example, when the APs 306a and 306b both broadcast the NDP messages 100 and 105 at 15s, the controller 302 may request that the AP 306a advance or delay its broadcast of the NDP messages 100 and 105 by 5s so their broadcasts no longer overlap or overlap less than before the requested change.

Figure 4:
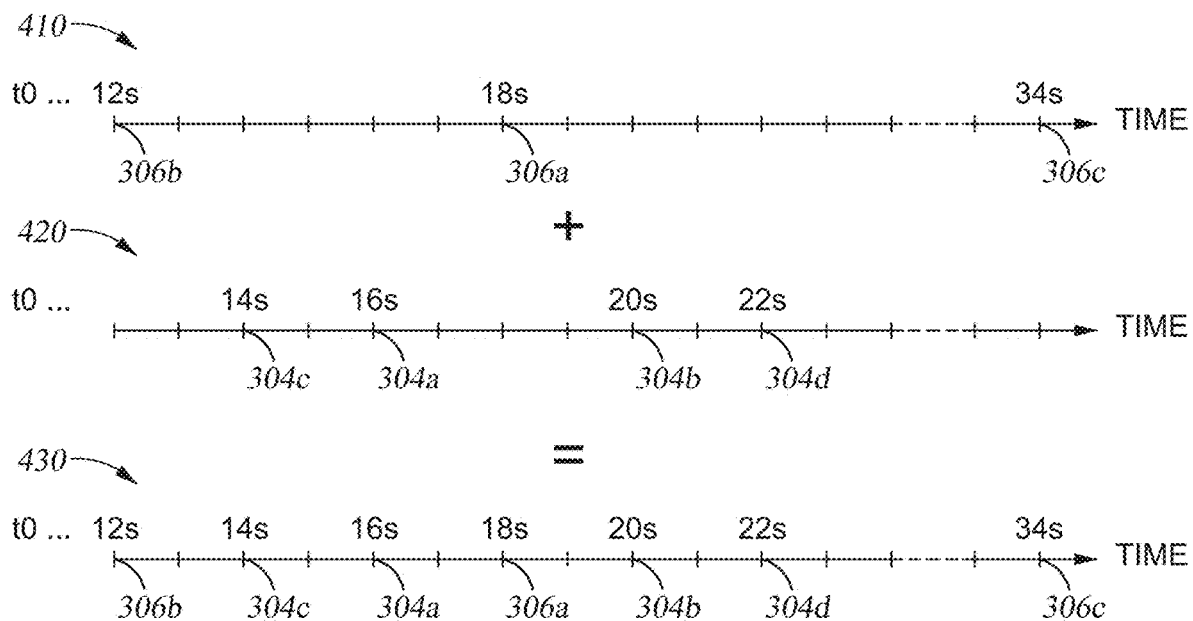
FIG. 4 is a collection of line graphs representative of how the controller builds a schedule of NDP messages broadcast times for the first group of APs and the second group of APs in the system.

Based on the determined on-channel NDP interval and the times at which individual APs 306 broadcast their NDP messages 100 and 105, the controller 302 may generate a schedule identifying time gaps between APs 306 broadcasting their NDP messages 100 and 105. A representation of such a schedule is shown in FIG. 4, described in more detail below. Scheduling of the APs 304 will be described with relation to FIG. 4.

FIG. 4 is a collection of line graphs representative of how the controller 302 builds a schedule of NDP messages broadcast times for the first group of APs 304 and the second group of APs 306 in the system 300a. Each line graph represents time along the x-axis, with each has on the line graph corresponding to 1s.

FIG. 4 comprises a first line graph 410 representing time along the x-axis and indicating when the APs 306a-306c are scheduled to transmit their respective NDP messages on-channel. Thus, as introduced above, the AP 306b broadcasts its NDP messages 100 and 105 at 12s (relative to an initial time t0, not shown in FIG. 4), while the AP 306a broadcasts its NDP messages 100 and 105 at 18s (relative to t0) and the AP 306c broadcasts its NPD messages 100 and 105 at 34s (relative to t0). Thus, as shown in the first line graph 410, there are windows of time between when the APs 306a-306c broadcast their respective NDP messages. Specifically, there is approximately a 6s window between the APs 306b and 306a and approximately a 16s window between the APs 306a and 306c.

Where the APs 306 without the auxiliary radios are expected to broadcast their NDP messages 100 and 105 according to the schedule of line graph 410, the controller 302 may coordinate the APs 304 having the auxiliary radios to visit each of the APs 306a-306c before the respective APs 306 broadcast their NDP messages 100 and 105 according to the schedule of the line graph 410. For example, as shown by the schedule of line graph 410, the APs 304 may be instructed to visit AP 306b on its home channel 36 at 12s when the AP 306b is scheduled to broadcast its NDP messages 100 and 105, visit AP 306a on channel 60 at 18s when the AP 306a is scheduled to broadcast its NDP messages 100 and 105, and visit AP 306c on channel 161 at 34s when the AP 306c is scheduled to broadcast its NDP messages 100 and 105 (all relative to the time t0). In some embodiments, this may comprise the APs 304 visiting the APs 306 some amount of time (for example, between 0.1s and 1s) before the scheduled broadcast time according to the line graph 410. In this way, the APs 304 can be sure to be present on the corresponding channel when each of the APs 306 broadcast their NDP message 100 and 105, thereby enabling the APs 304 to be monitoring the respective channels at appropriate times and obtain the NDP messages 100 and 105 from the respective APs 306. Similarly, the APs 306 may visit (or hop to the home channels of) the other APs 306 according to the schedule of line graph 410 to obtain the NDP messages 100 and 105 from the other APs 306.

Additionally, the controller 302 may generate a schedule indicating when the APs 304a-304e should broadcast their respective NDP messages 100 and 105. For example, a second line graph 420 represents a schedule generated by the controller 302 according to which the APs 304a-304e broadcast their respective NDP messages 100 and 105. The controller 302 schedules the APs 304a-304e such that the APs 304a-304e do not broadcast their NDP messages 100 and 105 at the same time as, or overlapping with, broadcasts from other APs 304 or any of the APs 306a-306c. As shown, the controller 302 schedules the AP 304c to broadcast its NDP messages at 14s, the AP 304a at 16s, the AP 304b at 20s, and the AP 304d at 22s. The AP 304e is not shown on the time line 420, and may fall before the 12s mark, after the 34s mark, or between the 24s and 33s marks along the line graph 420.

Thus, the APs 306 can be scheduled to broadcast NDP messages across an available spectrum and time. For example, the AP 306b may broadcast its NDP messages on channel 36, then the AP 306a may broadcast its NDP messages 6 seconds later on channel 60, and the AP 306c broadcasts its NDP messages 16 seconds later on channel 161, as introduced above. The controller 302 may schedule or coordinate the APs 304 to times and channels available between the scheduled APs 306 to create a predictable and regular schedule for all APs 304 and 306. For example, where there are gaps between when the APs 306 broadcast their NDP message, one or more APs 304 may be scheduled in such gaps. For example, where there is a gap of 6 seconds and 24 channels between the AP 306b and the AP 306c, the AP 304c can be scheduled to transmit its NDP messages on channel 44 before the AP 304a is scheduled to transmit its NDP messages on channel 52. Similarly, the AP 304b can be scheduled to transmit its NDP messages on channel 100 and the AP 306e is scheduled on channel 149. Thus, in scheduling the APs 304, the controller 302 may work to schedule the AP 304 within such gaps, such as mid-way in the time gaps and mid-way in the channel spacing. In some embodiments, the controller 302 attempts to identify an appropriate AP 304 to schedule it in the gap. This can be repeated with the APs 304 and the APs 306, with a goal of 1) attempting to have a regular jump schedule between APs 304 and/or 306 (for example, having a regular or similar amount of seconds and/or channels between each jumps) and 2) have the AP scan al active channels in turn. Each AP 304 and 306 may receive a unique schedule specific to or depending on a number of neighbors for the respective AP 304 or 306 and their respective channels.

In combination, the line graph 410 and the line graph 420 provide the line graph 430, which shows when all of the APs 304 and 306 of the system 300 are scheduled to broadcast their respective NDP messages. Thus, gaps between the NDP broadcasts of the APs 306 are populated with the NDP broadcast scheduling of the APs 304. In some embodiments, the scheduling of the APs 304 indicates when the APs 304 will visit the channels of each other AP 304. Thus, the APs 304 having the auxiliary radio and main radio may coordinate visiting each other AP 304 and the APs 306, and vice versa. According to the line graph 430, each of the APs 304 and the APs 306 can be coordinated.

Once the controller 302 generates the schedule corresponding to the line graph 430, the controller 302 may share the generated schedule with other WLCs or other APs 304 and 306 of the system 300. In some embodiments, as introduced above, the controller 302 can request that the WLCs modify the on-channel NDP message schedule for corresponding APs or can directly request that the APs 304 and 306 modify their on-channel NDP message schedule. For example, the controller 302 may request that the AP 306b adjust its NDP broadcast schedule from 12s after t0 to 15s after t0, and so forth.

In some embodiments, the controller 302 may modify or request modification of a schedule of one or more of the APs 304. For example, the controller 302 may request delay or advance of the NDP message schedule for the AP 304, such as from 70s instead of 60s. In some embodiments, the controller 302 may modify a broadcast time of a subsequent NPD message for one of the APs 304 and/or 306 during the calibration phase to avoid having more than one AP 304 or 306 broadcasting on-channel NDP messages on different channels at the same time. The controller 302 may modify the NDP message broadcast time for the AP 304 or 306 on an immediate basis (for example, directly changing a time from 12s to 13s, or the like) or progressively (for example, sliding to a 59s interval until t0+12 [modulo 60] is reached, then stay at t0+12 [modulo 60]).

According to the scheduling discussed above, the APs 304a-304e are able to obtain the NDP messages from each of the APs 304 and the APs 306. For example, the controller 302 identifies a subset of a list of allowed channels (that may have been defined by a resource management configuration) that match the channels on which the APs 306 broadcast NDP messages. The controller 302 may instruct the APs 304 (for example, through their WLCs or directly) to continue to visit the subset of the list of channels and broadcast NDP messages on these channels to enable the APs 306 to detect neighbor APs. In one embodiment, the controller 302 or the group leader also instructs all APs 304 and/or 306 to slow down or delay their off-channel visits to other channels.

Further details of the communications between the controller 302 and APs 304 and 306 are provided below with respect to FIG. 5.

Figure 5:
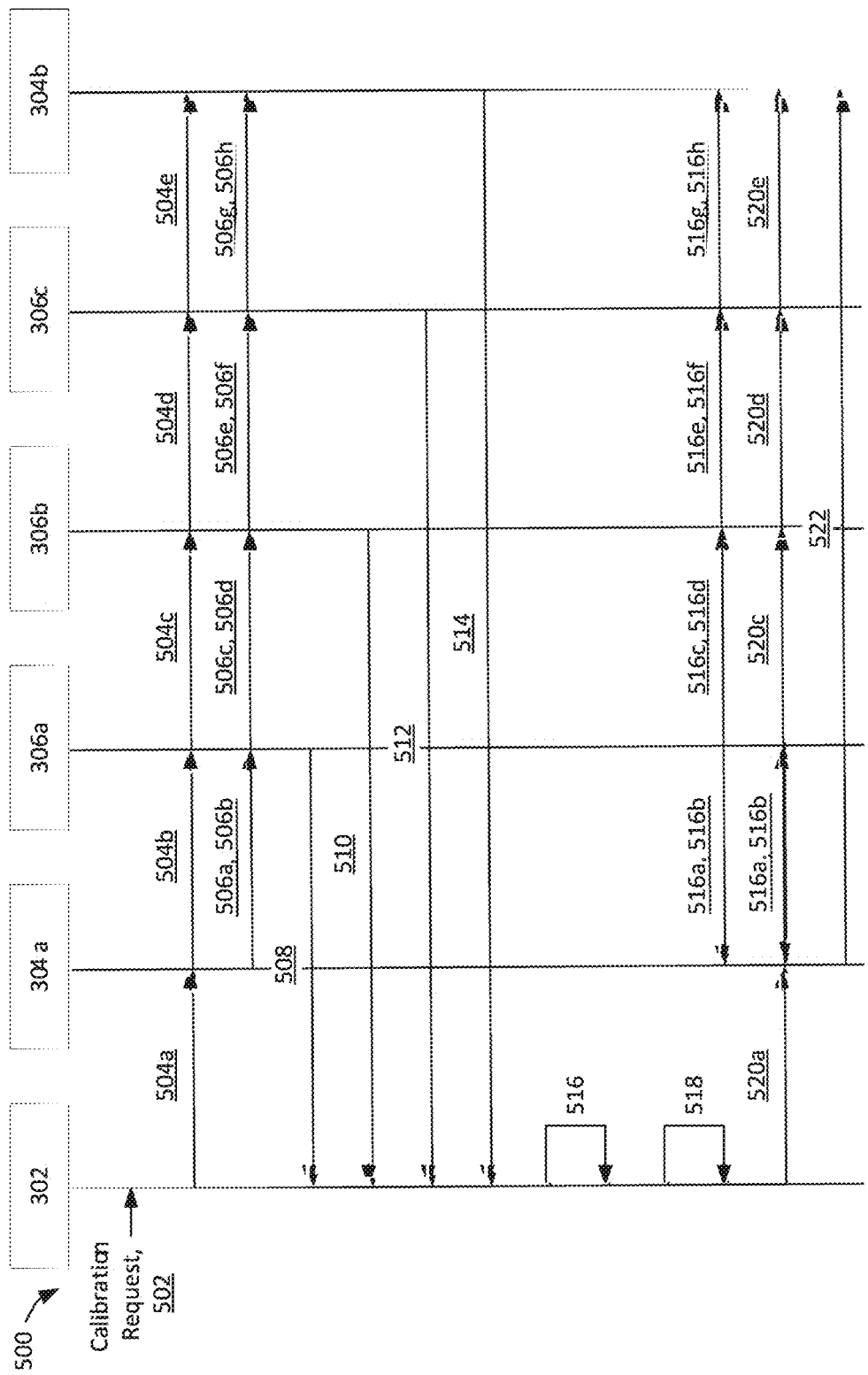
FIG. 5 depicts a communication flow diagram between components of a communication system, such as the communication system of FIG. 2 or the system of FIG. 3, that enables a controller of the communication system to identify neighbor APs and generate a neighbor discovery schedule for coordinating neighbor discovery between auxiliary radio capable APs, and non-auxiliary radio capable APs, according to an embodiment described herein.

FIG. 5 depicts a communication flow diagram 500 between components of a communication system, such as the communication system 200 of FIG. 2 or the system 300 of FIG. 3, that enables a controller of the communication system, such as the controller 202 or 302, to identify neighbor APs and generate a neighbor discovery schedule for coordinating neighbor discovery between auxiliary radio capable APs, such as APs 304, and non-auxiliary radio capable APs, such as APs 306, according to an embodiment described herein.

The flow diagram 500 begins with communication 502, where the controller 302 receives the request to initially calibrate or configure a communications system of APs.

At communications 504, which includes communications 504a-504e, the controller 302 indicates to each of the APs 304 and 306 to initiate the calibration process.

At communications 506, each of the APs 304 and 306 transmits the NDP messages in response to the communications 504 from the controller 302, as introduced above. In some embodiments, the AP may transmit the first NDP messages 100 and 105 as communications 506a and 506, respectively. In some embodiments, each AP may transmit the NDP messages 100 and 105 to each neighbor AP in the communication system to perform the NDP. Thus, as shown in the flow diagram 500, the AP 304a transmits the NDP messages 100 and 105 as communications 506a and 506b, 506c and 506d, 506e and 506f, and 506g and 506h, respectively, to each of the APs 306a, 306b, 306c and 304b, respectively.

At communication 508, the AP 306a provides a report of the received NDP messages from communications 506a and 506b. Similarly, for communications 510-514, the APs 306b, 305c, and 304b provide corresponding reports for their received NDP messages from communications 506c and 506d, 506e and 506f, and 506g and 506h, respectively.

At processing 516, the controller 302 groups the APs such that APs having auxiliary radio capabilities are grouped as APs 304 and APs without auxiliary radio capability are grouped as APs 306.

At processing 518, the controller 302 further generates on-channel schedules for the APs 306. In some embodiments, the generated on-channel schedules for the APs 306 further include a schedule for the APs 304 to visit the APs 306 to obtain the NDP messages for the APs 306.

At communications 520, the controller 302 distributes the generated on-channel schedules for the APs 306 to the APs 304 and 306. For example, the controller 302 distributes the generated on-channel schedules for the APs 306 to the AP 304a with communication 520a, to the AP 306a with communication 520b, to the AP 306b with communication 520c, to the AP 306c with communication 520d, and to the AP 304b with communication 520e. In some embodiments, the generated on-channel schedules also include schedules for the APs 304.

At communications 522, the AP 304a uses the generated and distributed on-channel schedules for the APs 306 and the APs 304 to obtain the NDP messages from the AP 304b.

In some embodiments, though not shown in FIG. 5, communications 506-514 may be repeated for corresponding communications from each of APs 306a, 306b, 306c, and 304b (and the remaining APs of the system 300) to enable the controller 302 to obtain the NDP messages from each of the AP 304 and 306 for use when generating the on-channel schedules for all of the APs 306.

Figure 6:
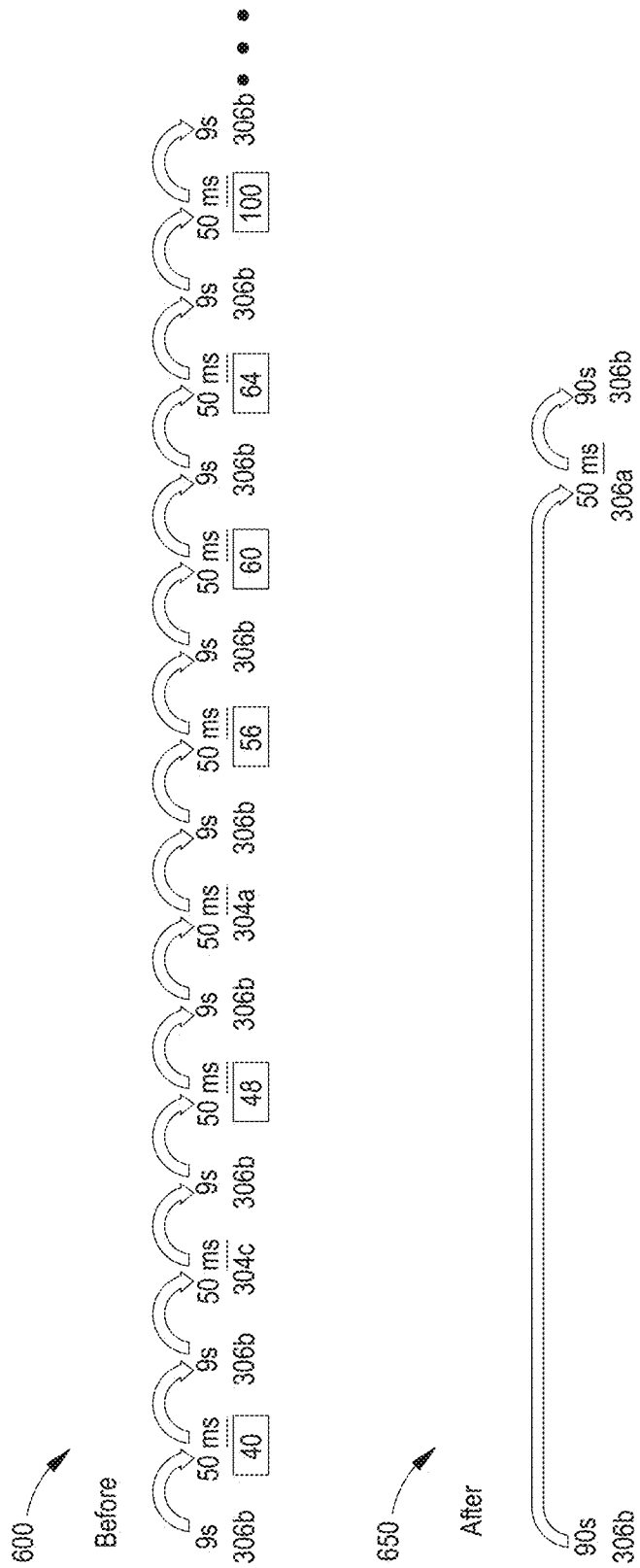
FIG. 6 depicts timing diagrams indicating intervals of an exemplary non-auxiliary radio AP communicating on a home channel and hopping to a neighboring channel for neighbor discovery, according to aspects described herein.

FIG. 6 depicts timing diagrams indicating intervals of an exemplary non-auxiliary radio AP communicating on a home channel and hopping to a neighboring channel for neighbor discovery, according to aspects described herein. Specifically, FIG. 6 depicts a first timing diagram 600 indicating channel hopping that is not coordinated according to a schedule and a second timing diagram 650 indicating channel hopping that is coordinated according to the schedule described herein.

The first timing diagram 600 indicates, for example, for the AP 306b, that the AP 306b spends an average of 9 seconds (s) performing communications on its home channel before hopping to a neighbor channel for a period of 50 milliseconds (ms). The AP 306b repeats this "schedule" of communicating for 9s on the home channel and hopping to a neighbor channel 50 ms. The neighbor channel to which the AP 306b hops may increment after returning to the APs home channel. For example, as shown in the first timing diagram 600, the AP 306b spends 9s communicating on the home channel, 50 ms hopping to the neighbor channel 40, 9s communicating back on the home channel, 50 ms hopping to the AP 304c on the neighbor channel 44, 9s communicating on the home channel, 50 ms hopping to the neighbor channel 48, and so forth, until the AP 306b has hopped to all neighbor channels possible in the allotted time.

As described above, this manner of hopping between channels every 9s can be disruptive to communications on the home channel for the AP 306b and involves the AP 306b hopping to channels on which there may not be any communications (such as channels 40, 48, 56, and so forth), which introduces inefficiencies. However, by adopting the off-channel hopping according to the coordinated schedule described herein, the AP 306b may improve its efficiencies and communications on its home channel 36, as described in more detail below. The second timing diagram 650 indicates how the AP 306*b*, having the home channel 36, communicates on its home channel for 90s during a first period before hopping to channel 64 (on which the AP 306*b* knows one of the APs in the system 300 communicates as its home channel) for 50 ms. Following the 50 ms hop to the channel 64, the AP 306*b* may hop back its home channel 36 for another 90s of communication, before jumping to the next identified channel for the next AP 306 (based on the distributed schedule). Accordingly, the AP 306*b* can remain on its home channel for an extended period and hop to a neighbor channel only when the corresponding neighbor AP is expected to broadcast its NDP, thereby improving efficiencies of communications on its home channel as well as improving neighbor discovery efficiencies as compared to the first timing diagram 600.

In some embodiments, the APs 306 may jump to neighboring channels according to the schedule introduced above relative to FIG. 4. However, as shown in the first timing diagram 600 and the second timing diagram 650, the AP 306*b* may hop to channels without any scheduled APs 304 and/or 306 to identify new or unscheduled APs 304 and/or 306. Thus, the schedule, which identifies known APs 304 and/or 306, may not identify unknown or new APs 304 and/or 306. Before, as shown in the timing diagram 600, the AP 306*b* may scan all channels, for example, jumping away from its active or home channel every 9 seconds to scan channels that are not part of the schedule, on average. The aspects described herein enable the AP 306*b* to avoid having to scan most channels and instead scan only certain channels, such as channel 64, where a new AP may join, as shown in the timing diagram 650. Thus, the AP 306*b* may still jump to check on the channel 64 to detect a new AP at a more regular interval. Thus, instead of having the AP 306*b* jump every 9 seconds as before, the AP 306*b* can now occasionally jump to the unscheduled or non-populated channels less often, such as once every 90 or 100 seconds instead of every 9 seconds.

Figure 7:
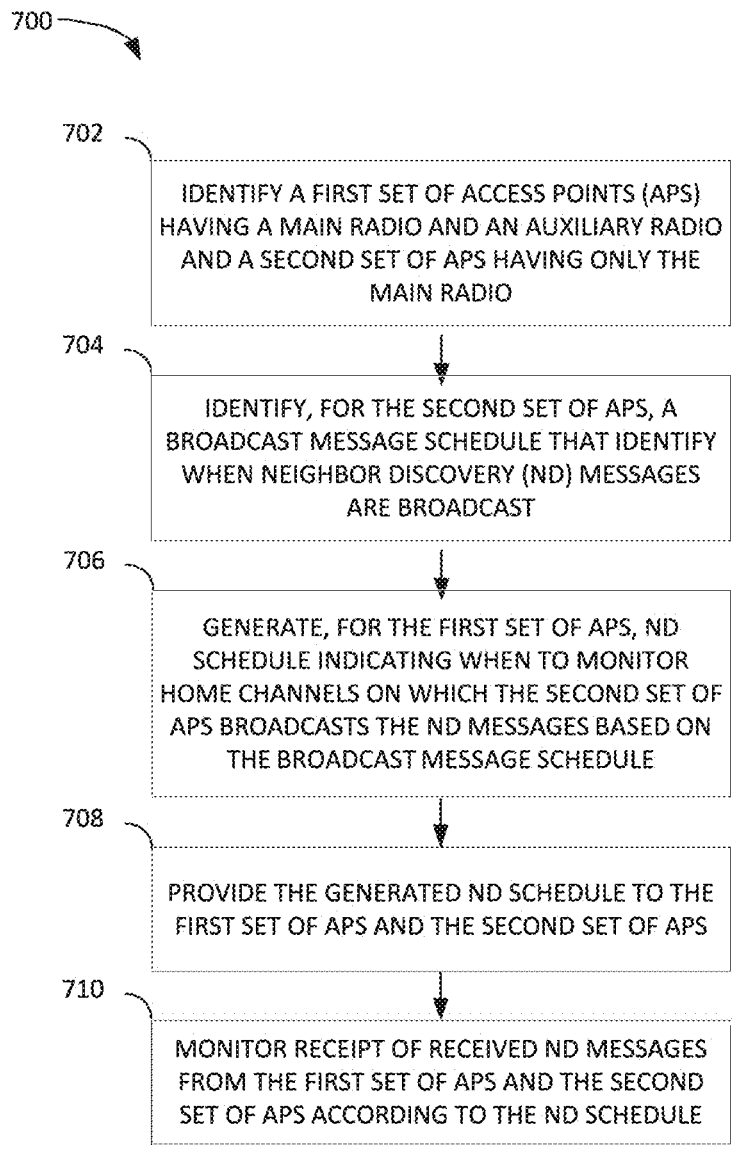
FIG. 7 is a flow chart of a method of scheduling neighbor access point (AP) discovery, such as in the communication system of FIG. 2 that comprises neighboring APs of different types and capabilities, according to aspects described herein.

FIG. 7 is a flow chart of a method 700 of scheduling neighbor access point (AP) discovery, such as in the communication system 200 of FIG. 2 that comprises neighboring APs of different types and capabilities, according to aspects described herein. For example, a first type of AP comprises an auxiliary radio, while a second type of AP does not comprise an auxiliary radio. Differences in the capabilities of the neighboring APs may impact how particular APs are scheduled to perform neighbor access point discovery. While the flow chart of the method 700 and corresponding description include reference to components of the system 200 of FIG. 2 and system 300 of FIG. 3, the blocks of the method 700 are not limited to those example embodiments and may apply to various other combinations of components. Furthermore, the method 700 is not required to perform each of or only the shown blocks and is not limited to performing the indicated blocks in any particular order.

At block 702, the controller identifies a first set of APs having a main radio and an auxiliary radio and a second set of APs having only the main radio. In some embodiments, the controller identifies different sets or types of APs using the NDP message introduced with respect to FIG. 1, where the NDP message identifies the supplemental information about the AP transmitting the NDP message. The NDP message comprising the supplemental information may be transmitted by each AP and received by neighbor APs.

At block 704, the controller identifies a broadcast message schedule for the second set of APs, where the broadcast message schedule identifies when the second set of APs broadcasts ND messages on corresponding home channels. The second set of APs may correspond to the second type, or non-auxiliary radio, AP having only the main radio. The broadcast message schedule may be determined based on messaging that occurs during an initial calibration stage, or the like. As introduced above, the schedule for the second set of APs is determined before that of the first set of APs because the second set of APs, which do not have the auxiliary radio. Without the auxiliary radio, broadcasting and receiving ND messages may conflict with communications on a home channel by the second set of APs. Scheduling the second set of APs first identifies to the first set of APs (and the others of the second set of APs) enables the second set of APs to reduce hopping times and only hop to neighbor channels when they need to and know when the neighbor AP on the neighbor channels will be broadcasting its ND message.

At block 706, the controller generates a ND schedule for the first set of APs. The generated ND schedule indicates to the first set of APs when the first set of APs should monitor the corresponding home channels on which the second set of APs broadcast their ND messages according to the broadcast message schedule. Specifically, as described above with reference to FIGS. 4 and 5, the ND schedule indicates when each of the second set of APs broadcasts. Thus, each AP of the second set knows when its neighbor will be broadcasting its ND message and know that it will be broadcast at a time when the AP of the second set can hop to the neighbor's home channel. In such a way, each AP of the second set can hop to the neighbor's home channel only when the neighbor is broadcasting its ND message and only stay for the ND message. This reduces the amount of time and the number of times the AP of the second set must hop from its home channel to a neighbor channel. Similarly, the first set of APs can use the ND schedule to identify when to have the auxiliary radios present on the home channel of each AP of the second set of APs to obtain corresponding ND messages.

At block 708, the controller comprises providing the generated ND schedule to the first set of APs and the second set of APs.

At block 710, the controller comprises monitoring receipt of received ND messages from the first set of APs and the second set of APs according to the neighbor discovery schedule.

Figure 8:
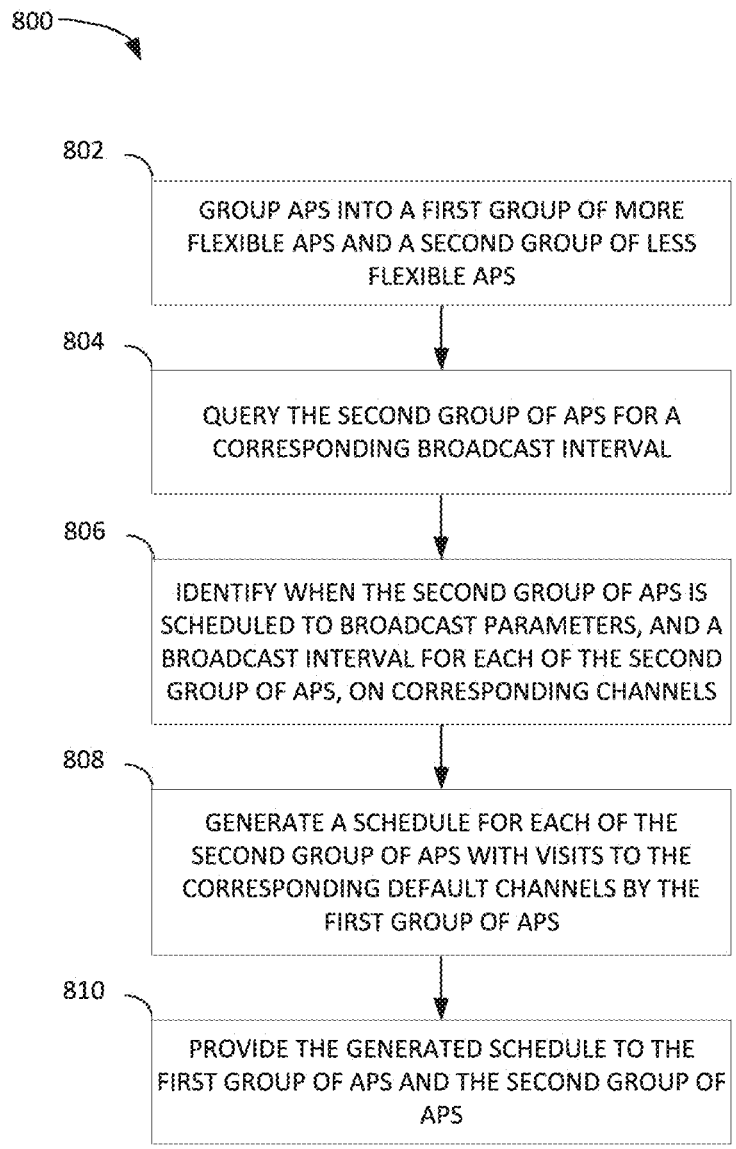
FIG. 8 is a flow chart of operations for discovering neighbor access point (AP), such as in the communication system of FIG. 2 that comprises neighboring APs of different types and capabilities, according to aspects described herein.

FIG. 8 is a flow chart of operations 800 for discovering neighbor access point (AP), such as in the communication system of FIG. 2 that comprises neighboring APs of different types and capabilities, according to aspects described herein. For example, a first type of AP comprises an auxiliary radio, while a second type of AP does not comprise an auxiliary radio. Differences in the capabilities of the neighboring APs may impact how particular APs are scheduled to perform neighbor access point discovery. While the flow chart of the operations 800 and corresponding description include reference to components of the system 200 of FIG. 2, such as the controller 202, and system 300 of FIG. 3, the blocks of the operations 800 are not limited to those example embodiments and may apply to various other combinations of components. Furthermore, the operations 800 is not required to perform each of or only the shown blocks and is not limited to performing the indicated blocks in any particular order.

At block 802, the controller groups a first type of APs into a first group of more flexible APs and groups a second type of APs into a second group of less flexible APs. In some embodiments, the controller identifies the different types of APs using the NDP message introduced with respect to FIG. 1, where the NDP message identifies the supplemental information about the AP transmitting the NDP message. The NDP message comprising the supplemental information may be transmitted by each AP and received by neighbor APs.

At block 804, the controller queries the second group of APs for a corresponding broadcast interval. The broadcast interval may be used by the controller to generate a broadcast schedule for the second group of APs.

At block 806, the controller identifies when the second group of APs is scheduled to broadcast parameters, and a broadcast interval for each of the second group of APs, on corresponding default channels.

At block 808, the controller generates a broadcast schedule based on the scheduled broadcast of the parameters and the broadcast interval for each of the second group of APs. The broadcast schedule identifies visits to the corresponding default channels by the first group of APs such that the first group of APs are present on the corresponding default channels when the corresponding second group of APs are scheduled to broadcast the parameters 700 comprises providing the generated ND schedule to the first set of APs and the second set of APs.

At block 810, the controller provides the generated schedule to the first group of APs and the second group of APs.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of discovering neighbor access points (APs), the method comprising:
   identifying a first set of one or more APs and a second set of one or more APs;
   identifying a message schedule for the second set of one or more APs, where the message schedule identifies when the second set of one or more APs transmits neighbor discovery (ND) messages on one or more corresponding home channels;
   generating an ND schedule for the first set of one or more APs, where the ND schedule indicates to the first set of one or more APs when to monitor the one or more corresponding home channels according to the message schedule;
   providing the generated ND schedule to the first set of one or more APs and the second set of one or more APs; and
   monitoring receipt of received ND messages from the first set of one or more APs and the second set of one or more APs according to the ND schedule.

2. The method of claim 1, further comprising causing each AP of the first set of one or more APs to:
   generate a first ND message comprising a first plurality of fields and a second ND message comprising the first plurality of fields and an enhanced field, and
   transmit the first ND message and the second ND message in subsequent cycles on the one or more corresponding home channels for the second set of one or more APs according to the ND schedule.

3. The method of claim 2, further comprising evaluating an ND message reported by a reporting AP to identify whether a corresponding AP that transmitted the evaluated ND message was transmitting on a home channel of the corresponding AP or a neighbor channel, whether the corresponding AP that transmitted the evaluated ND message belongs to the first set of one or more APs or the second set of one or more APs, whether the evaluated ND message received by the reporting AP was one of the first ND message or the second ND message, and whether the reporting AP is one of the first set of one or more APs or the second set of one or more APs.

4. The method of claim 1, further comprising sending a request to one or more of the second set of one or more APs to adjust an on-channel ND message schedule for the one or more of the second set of one or more APs.

5. The method of claim 1, wherein the generated ND schedule enables the first set of one or more APs to receive ND messages from other APs on the one or more corresponding home channels for the second set of one or more APs.

6. The method of claim 1, wherein the generated ND schedule enables the second set of one or more APs to receive ND messages from other APs of the second set of one or more APs on off-channels for the second set of one or more APs.

7. The method of claim 1, wherein the generated ND schedule limits all APs to monitoring off channels during extended intervals.

8. A wireless controller, comprising one or more processors and a memory storing instructions that, when executed by the one or more processors, cause the wireless controller to perform an operation, the operation comprising:
   grouping access points (APs) into a first group of APs and a second group of APs;
   querying the second group of APs for a corresponding message interval;
   identifying when the second group of APs is scheduled to transmit parameters, and an interval for each AP of the second group of APs, on corresponding default channels;
   generating a schedule based on the scheduled transmission of the parameters and the interval for each AP of the second group of APs with visits to the corresponding default channels by the first group of APs, wherein the first group of APs are present on the corresponding default channels when the second group of APs are scheduled to transmit the parameters; and
   providing the generated schedule to the first group of APs and the second group of APs.

9. The wireless controller of claim 8, wherein the operation further comprises causing each AP of the first group of APs to:
   generating a first neighbor discovery (ND) message comprising a first plurality of fields and a second ND message comprising the first plurality of fields and an enhanced field, and
   transmitting the first ND message and the second ND message in subsequent cycles on one or more home channels for the second group of APs according to an ND schedule.

10. The wireless controller of claim 9, further comprising evaluating an ND message reported by a reporting AP to identify whether a corresponding AP that transmitted the evaluated ND message was transmitting on a home channel of the corresponding AP or a neighbor channel, whether the corresponding AP that transmitted the evaluated ND message belongs to the first group of APs or the second group of APs, whether the evaluated ND message received by the reporting AP was one of the first ND message or the second ND message, and whether the reporting AP is one of the first group of APs or the second group of APs.

11. The wireless controller of claim 8, wherein the operation further comprises sending a request to one or more of the second group of APs to adjust an on-channel neighbor discovery (ND) message schedule for the one or more of the second group of APs.

12. The wireless controller of claim 8, wherein the generated schedule enables the first group of APs to receive neighbor discovery (ND) messages from other APs on one or more home channels for the first group of APs.

13. The wireless controller of claim 8, wherein the generated schedule enables the second group of APs to receive neighbor discovery (ND) messages from other APs on off-channels for the second group of APs.

14. The wireless controller of claim 8, wherein the generated schedule limits all APs to monitoring off-channels during extended intervals.

15. A system for discovering neighbor access points (APs), the system comprising:
   a plurality of APs configured to manage communications on one or more channels;

a controller circuit configured to:
- identify a first set of one or more APs from the plurality of APs;
- identify a second set of one or more APs from the plurality of APs;
- identify a message schedule for the second set of one or more APs, where the message schedule identifies when the second set of one or more APs transmits corresponding neighbor discovery (ND) messages;
- generate an ND schedule, where the ND schedule indicates to the first set of one or more APs and the second set of one or more APs when to monitor one or more home channels according to the message schedule;
- provide the generated ND schedule to the first set of one or more APs and the second set of one or more APs; and
- monitor receipt of received ND messages from the first set of one or more APs and the second set of one or more APs according to the ND schedule.

16. The system of claim 15, wherein the controller circuit is further configured to:
- generate a first ND message comprising a first plurality of fields and a second ND message comprising the first plurality of fields and an enhanced field, and
- transmit the first ND message and the second ND message in subsequent cycles on the one or more home channels for the second set of one or more APs according to the ND schedule.

17. The system of claim 16, wherein the controller circuit is further configured to:
- evaluate an ND message reported by a reporting AP; and
- identify:
  - whether a corresponding AP that transmitted the evaluated ND message was transmitting on a home channel of the corresponding AP or a neighbor channel,
  - whether the corresponding AP that transmitted the evaluated ND message belongs to the first set of one or more APs or the second set of one or more APs,
  - whether the evaluated ND message received by the reporting AP was one of the first ND message or the second ND message, and
  - whether the reporting AP is one of the first set of one or more APs or the second set of one or more APs.

18. The system of claim 16, wherein the controller circuit is further configured to send a request to one or more of the second set of one or more APs to adjust an on-channel ND message schedule for the one or more of the second set of one or more APs.

19. The system of claim 16, wherein the generated ND schedule enables the first set of one or more APs to receive ND messages from other APs on the one or more home channels for the second set of one or more APs.

20. The system of claim 16, wherein the generated ND schedule enables the second set of one or more APs to receive ND messages from other APs of the second set of one or more APs on off-channels for the second set of one or more APs.

* * * * *